March 17, 1931.  J. P. DALY  1,796,283
CLUTCH MECHANISM
Original Filed Dec. 9, 1925  2 Sheets-Sheet 1
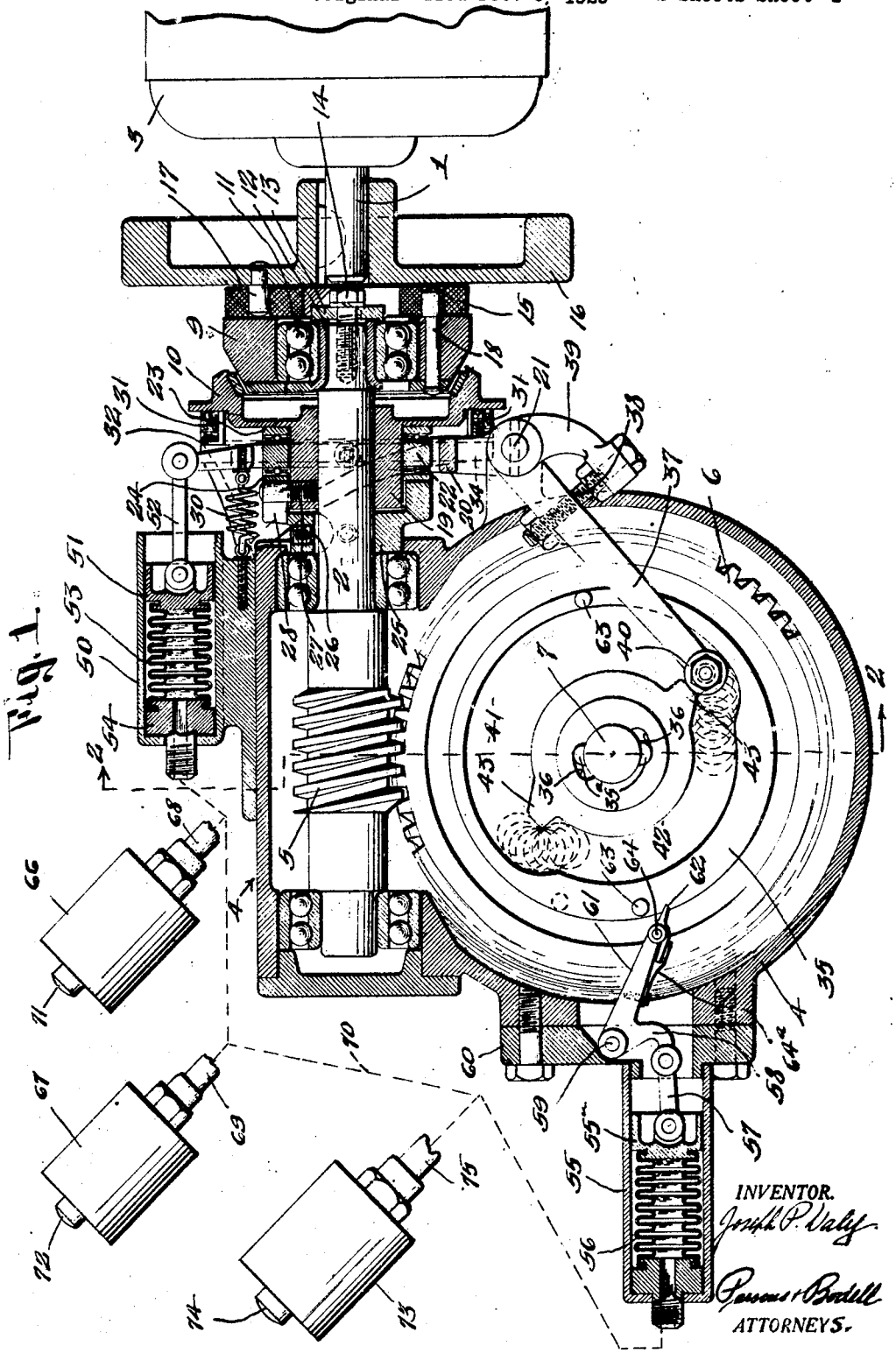
INVENTOR.
Joseph P. Daly
Parsons & Bordell
ATTORNEYS.

March 17, 1931.  J. P. DALY  1,796,283
CLUTCH MECHANISM
Original Filed Dec. 9, 1925  2 Sheets-Sheet 2
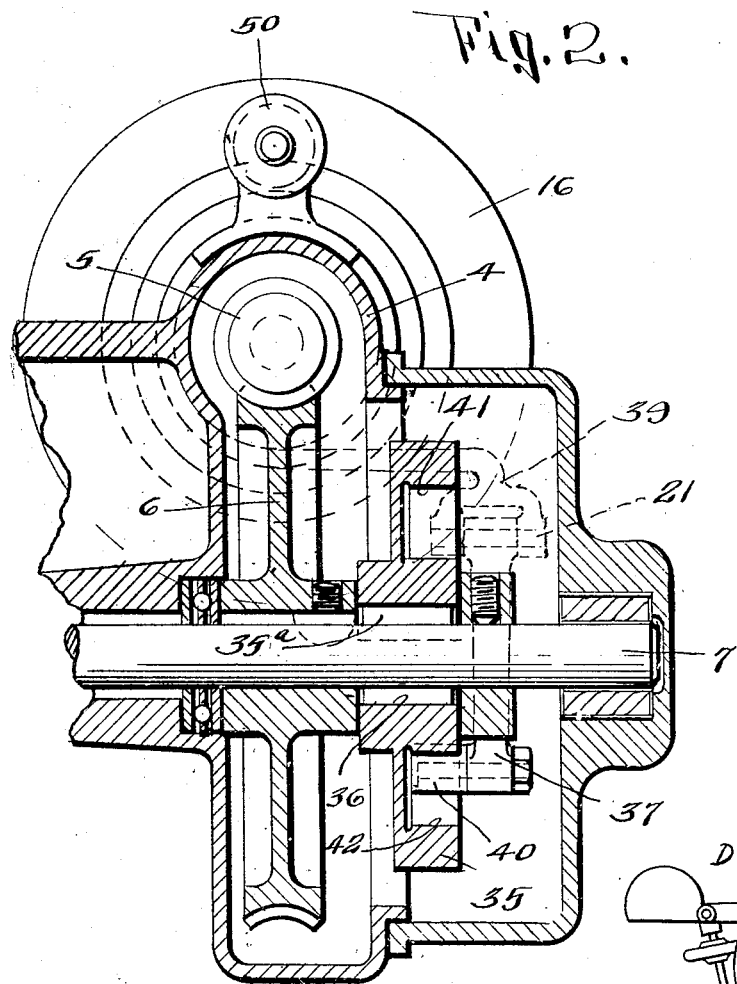
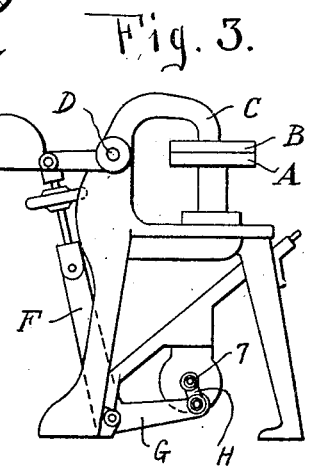
INVENTOR.
BY Joseph P. Daly
Parsons & Bodell.
ATTORNEYS.

Patented Mar. 17, 1931

1,796,283

UNITED STATES PATENT OFFICE

JOSEPH P. DALY, OF NORWOOD, OHIO, ASSIGNOR TO THE PROSPERITY COMPANY, INC., OF SYRACUSE, NEW YORK, A CORPORATION OF NEW YORK

CLUTCH MECHANISM

Application filed December 9, 1925, Serial No. 74,269. Renewed July 6, 1929.

This invention relates to clutch mechanism particularly periodic clutch mechanism, and has for its object an operating and controlling mechanism therefor by which the operator is required to use both hands to engage the clutch and hold the clutch engaged during one of the periods of operation of the clutch, as the period in which the clutch is engaged while a part of the driving mechanism of a press having an opening and closing movement is in operation so that there is no liability of the operators hands being caught in the press. Other objects appear throughout the specification.

The invention consists in the novel features and in the combinations and constructions hereinafter set forth and claimed.

In describing this invention reference is had to the accompanying drawings in which like characters designate corresponding parts in all the views.

Figure 1 is a longitudinal sectional view through a clutch mechanism embodying my invention.

Figure 2 is an enlarged fragmentary sectional view on line 2—2, Figure 1.

Figure 3 is an elevation of a pressing machine embodying my invention.

This clutch mechanism comprises, generally, driving and driven shafts, shiftable clutch sections normally disengaged and rotatable respectively with such shafts, one section being shiftable into and out of engagement with the other, means as a spring acting on a shifter or fork for holding the fork or the shiftable section in disengaged or out position, and for returning the section to its out position when the force tending to hold it in its engaged position is discontinued, locking mechanism for normally holding the shiftable section from shifting movement, manual means including mechanism for preliminarily operating the locking mechanism to unlock the cam and to shift the shiftable section into its engaged position, said manual means comprising two operating members and connections by which both of said members act to effect the throwing of the clutch section to its engaged position, and one of them, and preferably either of them, operates to unlock the locking mechanism whereby the operating of both operating members is required to unlock the locking mechanism and to throw the clutch section into engaged position.

1 and 2 designate, respectively, the driving and driven shafts which are arranged in axial alinement, the driving shaft being the armature shaft of an electric motor 3, and the driven shaft being mounted in bearings in a suitable housing or casing 4.

The driven shaft is here shown as having a worm 5 thereon which meshes with the worm gear 6 mounted on a third shaft 7, extending crosswise of the shaft 2, the third shaft serving to transmit the motion to a mechanism to be actuated as the motion transmitting mechanism of a pressing machine. The third shaft 7 is journaled in suitable bearings in a housing 4.

9 and 10 are respectively the driving and driven sections of the clutch, the section 10 of which is rotatable with the driven shaft 2 being preferably shiftable axially into and out of engagement with the driving section 9. However both sections are mounted upon the same shaft as the driven shaft 2, the driving section 9 being rotatable relatively to or about the driven shaft 2. The driving section 9 is here shown as mounted on an antifriction bearing 11 which includes an inner ring mounted upon a sleeve 12 on a reduced end portion of the driven shaft 2. This sleeve 12 and the bearing are held from displacement by a washer 13 abutting against the end of the sleeve 12 and thrusting it against the shoulder at the inner end of the reduced portion of the shaft 2 on which the sleeve is mounted. The washer is held in position by a screw 14 extending through the washer and threading into the end of the shaft 2.

This driving section is connected to the driving shaft through a suitable coupling as a flexible disk 15 keyed to the fly wheel 16 on the shaft 1, by one or more pins 17, and similarly keyed to the driving section 9 by one or more pins 18. This mounting of the clutch sections on the same shaft on the driven shaft makes the clutch mechanism a unit which can be readily applied to any motor. The clutch here shown is a cone clutch.

The driven section 10 has a hub 19 slidably mounted on the shaft 2, this hub being shiftable by means of a fork 20 pivoted at 21 to a lug on the housing 4 and having a bifurcated or ring shaped portion which coacts with the ring 22, lying between two collars 23, 24 on the hub 19. The collar 23 thrusting against the web of the clutch section 10 and the collar 24 has a hub 25 keyed to the shaft 2 as by a Woodruf key and set screw 26. The collar 24 is keyed to the hub 19 of the section 10 by a pin 27 threading into the hub 19 and movable in a lengthwise slot 28 in the collar 24, suitable anti-friction thrust bearings are interposed between the ring 22 and the collars.

The ring 22 has trunnions on its opposite sides which are connected to the bifurcated portions of the shifter or fork 20. A spring 30 is connected at one end to the shifter and at its other end to the casing 4. Suitable brake disks 31 are interposed by the rear side of the clutch section 10, an abutment plate 32 fixed from rotary movement and carried by suitable brackets 34 projecting from the housing 4.

Obviously shifting of the fork 20 to the right will carry the clutch section 10 into engagement with the clutch section 9, and such movement will move the clutch section 10 relatively to the collar 24 owing to the pin and slot connection 27—28. Movement of the shifter 20 to the left by the spring 30 when the force tending to hold the shifter 20 in its right hand position is discontinued, will disengage the clutch sections 9 and 10 and cause a brake disk 31 to stop the rotation of the driven section 10 and shaft 7.

The locking mechanism for normally preventing the shifting of the section 10 into engagement with the section 9 is actuated or controlled from the driven shaft or some part driven thereby as the third shaft 7 and comprises a controller element rotatable with the shaft 7, and having a preliminarily shifting movement about its axis relatively to the shaft 7 or the driven shaft 2 and a lock element coacting with the controller element and connected to the clutch shifter. This controller element is here shown as a cam 35 mounted on the shaft 7 and having a wide key way or key ways 36 therein for receiving keys 35a of less width than the key ways so that the cam can rotate a limited distance relatively to the shaft 7. The lock element is coacting with a lever 37 connected to the fork to shift it and hence shift the clutch section 10, this lever having a follower coacting with the cam. The lever 37 is mounted upon the same shaft 21 that the shifting fork 20 is mounted on, and it is connected to the shifting fork 20 by an adjusting screw 38 extending through the lever 37, and through an arm 39 depending from the shifter fork 20 below the shaft 21. This connection between screw 38 is merely for the purpose of adjustment.

The cam is here shown as formed with a cam groove at its side face and the lever 37 has a follower or roller 40 in the groove. The groove comprises a wide portion 41 and a narrow portion 42 and cam points or lifters 43 at the junctions of said wide and narrow portions. The outer wall of the wide portion is of greater radius than the outer wall of the narrow portion 42 but the inner wall of both portions are of substantially the same radius.

The manual means includes two operating members both of which must be operated to unlock the shifter fork 20 and to shift it. The manual means comprises means for moving the cam 35 about its axis relatively to the shaft 7, and thus moving it a sufficient amount to unlock the shifter fork 20 so that the shifter fork can be actuated by the manual means to carry the clutch section 10 into engagement with the clutch section 9 after such preliminary movement by the manual means, or after the lost motion between the key 35a and the key way 36 is taken up. The follower or roller 40 normally rides on one or the other of the cam points 43 so that the shifter fork 20 cannot be actuated. The preliminary movement or rotaton of the cam 35 relatively to the shaft 7 moves the cam 35 in a clockwise direction, and shifts the cam point 43 out of engagement with the follower so that now when the fork 20 is shifted the arm 37 is free to move to the inner side of the cam groove. During one period of the cycle of movement of the cam, that is while the cam is making a half revolution when the press is being closed, the roller or follower goes to the bottom or inner side of the wider portion 41 of the cam groove so that the force tending to hold the clutch section 10 engaged must be constantly applied against the spring 30 and on the discontinuing of such force at any time during such period of movement, the clutch section 10 will automatically shift to its out position. When the cam is in the diametrically opposite position from that shown in Figure 1, that is when the positions of the wide and narrow portions 41 and 42 of the cam groove are reversed the preliminary movement of the cam 35 by manual means will shift the cam point 43 in a clockwise direction as before out of engagement with the follower or roller 40, and force the roller to the bottom of the narrow portion 42 of the cam groove, thus throwing in the clutch section 10 and holding it in while the cam makes a half revolution when the cam point will again push the follower outwardly permitting the spring 30 to open the clutch.

This period of the cycle of movement takes place when a press is being opened and hence when there is no danger of the operator being injured if both hands are not busy, and to effect this operation but a momentary operation of the manual means is necessary.

The manual means here illustrated are included in pressure operated or hydraulic elements, as for instance cylinders and pistons movable in the cylinders, connections as pipes through which the pressure is transferred from operating means to the cylinders. The operating means are also a pair of pressure operated elements as cylinders having manually operable pistons therein.

50 designates the cylinder and 51 the piston movable therein for operating the fork 20 against the spring 30, the piston being connected to the fork by a link 52. The piston here shown includes a head slidable in the cylinder and a sylphon 53 connected to one end to the head and at its other end to a head 54 within the cylinder.

The element for preliminarily rotating the cam 35 is of similar construction, the cylinder being designated 55, the piston 55a, the sylphon 56. The piston 55a is connected by a link 57 to an actuator or lever 58 pivoted at 59 to a head 60 of the housing 4, the lever 58 having an arm 61, carrying a ratchet tooth 62 thereon arranged to strike a shoulder or pin 63 on the cam. There are two of these shoulders 63 diametrically opposite each other. The tooth 62 is pivoted at 64 to the end of the lever arm 61 and is pressed by a spring 64a. This tooth is mounted to ratchet downwardly past the shoulder 63, but to have a rigid connection with the shoulder 63 in order to move the cam 35 in a clockwise direction. Obviously during movement of the lever 58, by the piston 5, the tooth 62 will engage the pin 63 and shift the cam until the pin is in the position indicated in dotted lines in Figure 1, such movement taking up the lost motion between the key 35a and the key slot 36, and moving the cam in a clockwise direction sufficiently to move either one of the cam points 43 out from under the follower 40.

The operating elements are here shown as cylinders 66 and 67 having pistons or sylphons therein similar to those heretofore described. The cylinders 66 and 67 are connected by pipes 68 and 69 to one pipe or conduit 70 connected to both cylinders 50 and 55. These cylinders 66 and 67 are of such capacity that both the pistons must be depressed to actuate the piston 51. Although either one of them has sufficient capacity to operate the lever 61 to unlock the lock mechanism. The pipe system 68, 69 and 70 and the cylinders are filled with a fluid as oil.

Upon the depression of either one of the buttons 71, 72 which are connected to the pistons or sylphons within the cylinders 66 and 67, the piston 55 will be actuated to actuate the lever 58 and hence preliminarily shift the cam 35 to unlock the shifter fork 30 while thereafter the operator depresses the other button while holding the first depressed so that now the pressure in the pressure system is sufficient to actuate the piston 51 to shift the fork 20 against the action of the spring 30 and hence to carry the clutch section 10 into engagement with the clutch section 9, so that the shaft 2 is actuated by the driving shaft 1. If at any time the operator lets go of either buttons 71 or 72, the pressure in the pipe system will be relieved so that one button cannot exert enough pressure to hold in the clutch.

It is, therefore, necessary to operate the piston in both cylinders 66 and 67 simultaneously to throw in and to hold in the clutch while the follower is in the wider portion 41 of the cam slot. However when the follower is at the entrance of the narrower portion 42 of the cam slot, the depression of either one of the pistons in the cylinders 66—67 will throw in the clutch for the reason that the depression of either one of such pistons will actuate the cam preliminarily and in so doing the follower will be forced by the narrower portion 42 of the cam groove inwardly to the inner side of the narrower part 42 of the cam groove, and such inward forcing will actuate the lever 37 and fork 20. However such an operation may in some instances require too much force for one cylinder and, therefore, to operate the machine with such a condition present it would be necessary to depress both buttons.

Usually when this clutch mechanism is applied to two or more machines operated by one operator each machine has a remote control near the other machine, such remote control consisting of a cylinder 73 having a sylphon therein operated by a button 74, the cylinder being connected by a pipe 75 in the pipe 70. It will be understood that the cylinder 73 is located remote from the machine it controls as on another machine where the operator works on more than one machine. This cylinder 73 is of sufficient size or capacity so that the depression of the piston therein actuates both pistons 51 and 55.

In Figure 3 is shown a pressing machine embodying the usual stationary buck A, a movable press head B carried by a yoke or lever C, pivoted at D between its ends to an upright rising from the frame of the machine, the yoke C being actuated by a toggle F, connected to the rear arm of the yoke, the lower link of the toggle having forwardly extending lever arm G, which is actuated by the shaft 7, it being connected to the shaft 7 by a crank and connecting rod H. Upon turning the shaft 7 one-half revolution the arm G will be depressed to straighten the toggle F and bring the press head B down on the work on the buck A. Another half revolution of the shaft 7 will raise the lower G and fold the toggle 7, thus lifting the head B off the buck A or opening the press. While the press head 5 is being closed, the follower 40 is in the wider portion 41 of the cam somewhat so that both buttons 65, 66 must be held depressed until the press is closed. When the press is being opened the follower is in the narrower portion 42, and hence it is necessary to give but a momentary operation of the button 71, 72 or the remote control button 74 as the cam follower being in the narrower portion 42 of the cam groove, holds the shifter fork 20 in its closed position until one of the com points 43 rides under the follower and forces it to the outer side of the entrance of the wider portion 41 of the cam groove. A clutch is controlled by the rotation of the slower running shaft 7. As the clutch connects two high speed shafts connected to the power shaft 7 through a reduction gearing it may be comparatively small comparted with a clutch necessary to carry the torque load of the shaft 7.

Owing to the arrangement of the clutch on the driven shaft 2, the clutch mechanism can be assembled with the drive mechanism and such mechanism may be readily applied to any motor. The operator depresses both buttons or heads 71, 72 thus preliminarily rotating the cam 35 to move the cam point 43 out from under the follower of the lock lever 37 so that the pressure in the cylinders 67 is transferred to the cylinder 50 to actuate the piston 51 therein, and hence actuate the fork 20 against the spring 30 to engage the clutch section 10 with the section 9. As long as the operator holds both these heads or buttons 71, 72 depressed, the clutch will be held in against the spring 30. When the shaft 7 makes a half revolution the operator determines by the feel of the machines when the head is closed and releases the buttons 71, 72. When the press is closed the parts are in a diametrically opposite position from that shown in Figure 1, and to open the press either one of the push buttons 71, 72 may be depressed, if sufficient force can be applied to the piston 55 to rotate the cam 35 to carry the cam point 43 out from under the roller, and at the same time exert sufficient rotative force on the cam to cause it to force the cam follower downwardly into the entrance of the norrawer portion 42 of the cam slot, and thus throw in the clutch, otherwise both bush buttons 71, 72 must be depressed to throw in the clutch 42.

The follower being in the narrower portion of the cam groove slot holds the clutch engaged until the shaft makes another half revolution that is until the press opens, and at the end of the half revolution the incline on the cam 43 forces the follower to the outer side of the entrance of the wider portion 41, of the cam slot, thus throwing the lever 37 to actuate the shifter fork 20 or permit the spring 30 to actuate the fork to throw the clutch into open position.

What I claim is:—

1. In a clutch mechanism, the combination of driving and driven shafts arranged in axial alinement, a third shaft arranged crosswise of the driven shaft, reduction gearing connecting the driven shaft and the third shaft, normally disengaged clutch sections rotatable respectively with the driving and driven shafts, one section being shiftable in and out of engagement with the other, a shifter for shifting the shiftable section and a spring acting on the shifter to hold the shiftable section out of engaged position, manual means operable to actuate the shifter to shift the shiftable section into engaged position, locking means for normally holding the shifter from movement by the manual means comprising a controller mounted on the third shaft and rotatable therewith, and also having a movement about its axis relatively to the third shaft, and the manual means including a part for shifting the controller to permit the shiftable clutch section to be moved by the manual means into engaged position.

2. In a clutch mechanism, the combination of driving and driven shafts arranged in axial alinement, a third shaft arranged crosswise of the driven shaft, reduction gearing connecting the driven shaft and the third shaft, normally disengaged clutch sections rotatable respectively with the driving and driven shafts, one section being shiftable in and out of engagement with the other, a shifter for shifting the shiftable section and a spring acting on the shifter to hold the shiftable section out of engaged position, manual means operable to actuate the shifter to shift the shiftable section into engaged position, locking means for normally holding the shifter from movement by the manual means comprising a controller mounted on the third shaft, said controller comprising a cam provided with a cam groove having a wide portion and a narrow portion, the outer wall of the wide portion being of greater radius than the outer wall of the narrow portion, and the inner walls of both portions being of substantially the same radius, the cam having points at the junctions of said groove portions, the lock mechanism further including a part connected to the shifter to shift the same, and a follower in the cam groove, the controller having a movement about its axis relatively to the third shaft, and the manual means including a part for shifting the controller to permit the shiftable clutch section to be moved by the manual means into engaged position.

3. In a clutch mechanism, the combination of driving and driven shafts, normally disengaged clutch sections rotatable respectively with such shafts, one section being shiftable into and out of engagement with the other, a shifter coacting with the shiftable section, means tending to throw the shiftable section in one direction, lock mechanism for normally holding the shifter and the shiftable section from shifting movement by said means, and manual means including connections for operating the lock mechanism to unlock the same and shift the shiftable clutch section in the other direction; the lock mechanism comprising a rotatable part connected to the driven shaft to be actuated thereby, said part being shiftable about its axis relatively to the driven shaft, said connections of the manual means coacting with said part to shift the same about its axis.

4. In a clutch mechanism, the combination of driving and driven shafts, normally disengaged clutch sections rotatable respectively with such shafts, one section being shiftable into and out of engagement with the other, a shifter coacting with the shiftable section, means tending to throw the shiftable section in one direction, lock mechanism for normally holding the shifter and the shiftable section from shifting movement by said means, and manual means including connections for operating the lock mechanism to unlock the same and to shift the shiftable clutch section in the other direction, the lock mechanism comprising a rotatable cam connected to the driven shaft to be actuated thereby, said cam also being shiftable about its axis relatively to the driven shaft, said connections coacting with the cam to shift it about its axis.

5. In a clutch mechanism, the combination of driving and driven shafts, normally disengaged clutch sections rotatable respectively with such shafts, one section being shiftable into and out of engagement with the other, a shifter coacting with the shiftable section, means tending to throw the shiftable section into disengaged position, lock mechanism for normally holding the shifter and the shiftable section from shifting into engaged position and manual means including connections for operating the lock mechanism to unlock the same and to shift the shiftable clutch section into engaged position, the lock mechanism including a rotatable part connected to the driven shaft to be actuated thereby and also shiftable about its axis relatively to the driven shaft and a member coacting with said part, said part having means for holding the lock member "out" during a part of the cycle of movement of the driven shaft, and permitting it to return to its locked position during another part of the cycle of movement of the driven shaft unless held in its unlocked position by its manual means.

6. The clutch mechanism of claim 4 in which the cam has a cam groove, a portion of the groove being wider and having its outer wall of larger radius than that of the other portion, the inner wall of both portions being of substantially the same radius, the cam also having points at the junctions of said portions and a member connected to the shifter to shift the same to its "out" position and having a follower movable in the cam groove.

7. The combination of a shiftable member for controlling the transmission of motion to a driven member, a shifter coacting with said shiftable member, means tending to throw the shifter in one direction, lock mechanism for normally holding the shifter and the shiftable member from shifting movement by said means, and manual means including connections for operating the lock mechanism to unlock the same and shift the shiftable member in the other direction, the lock comprising a rotatable part, timing gearing connecting the driven member and the rotatable part, said part being shiftable about its axis and relatively to the driven member, said connections of the manual means coacting with said part to shift the same about its axis.

8. The combination of a shiftable member for controlling the transmission of motion, a driven member to be actuated, a shifter coacting with said member, means tending to throw the shiftable member in one direction, lock mechanism for normally holding the shifter and the shiftable member from shifting movement by said means, and manual means including connections for operating the lock mechanism to unlock the same, and shift the shiftable member in the other direction, the lock mechanism comprising a rotatable cam, reducing gearing between the driven member and the cam, said cam being shiftable about its axis relatively to the driven means and said connections coacting with the cam to shift it about its axis.

9. The combination of a shiftable member for controlling the transmission of motion, a driven member, a shifter coacting with said member, means tending to throw the shiftable member in one direction, lock mechanism for normally holding the shifter and the shiftable member from shifting movement by said means, and manual means including connections for operating the lock mechanism to unlock the same and shift the shiftable member in the other direction, the lock mechanism including a rotatable part connected to the driven member to be actuated thereby and also shiftable about its axis relatively to the driven member and a second part coacting with the first part, it having means for holding the locking part out during a portion of the cycle of movement of the driven member and permitting said locking part to return to its locked position during another portion of the cycle of movement of the driven member unless held in the locked position by its manual means.

In testimony whereof, I have hereunto signed my name, at Syracuse, in the county of Onondaga, and in the State of New York, this 4th day of Dec., 1925.

JOSEPH P. DALY.